United States Patent Office 2,972,904
Patented Feb. 28, 1961

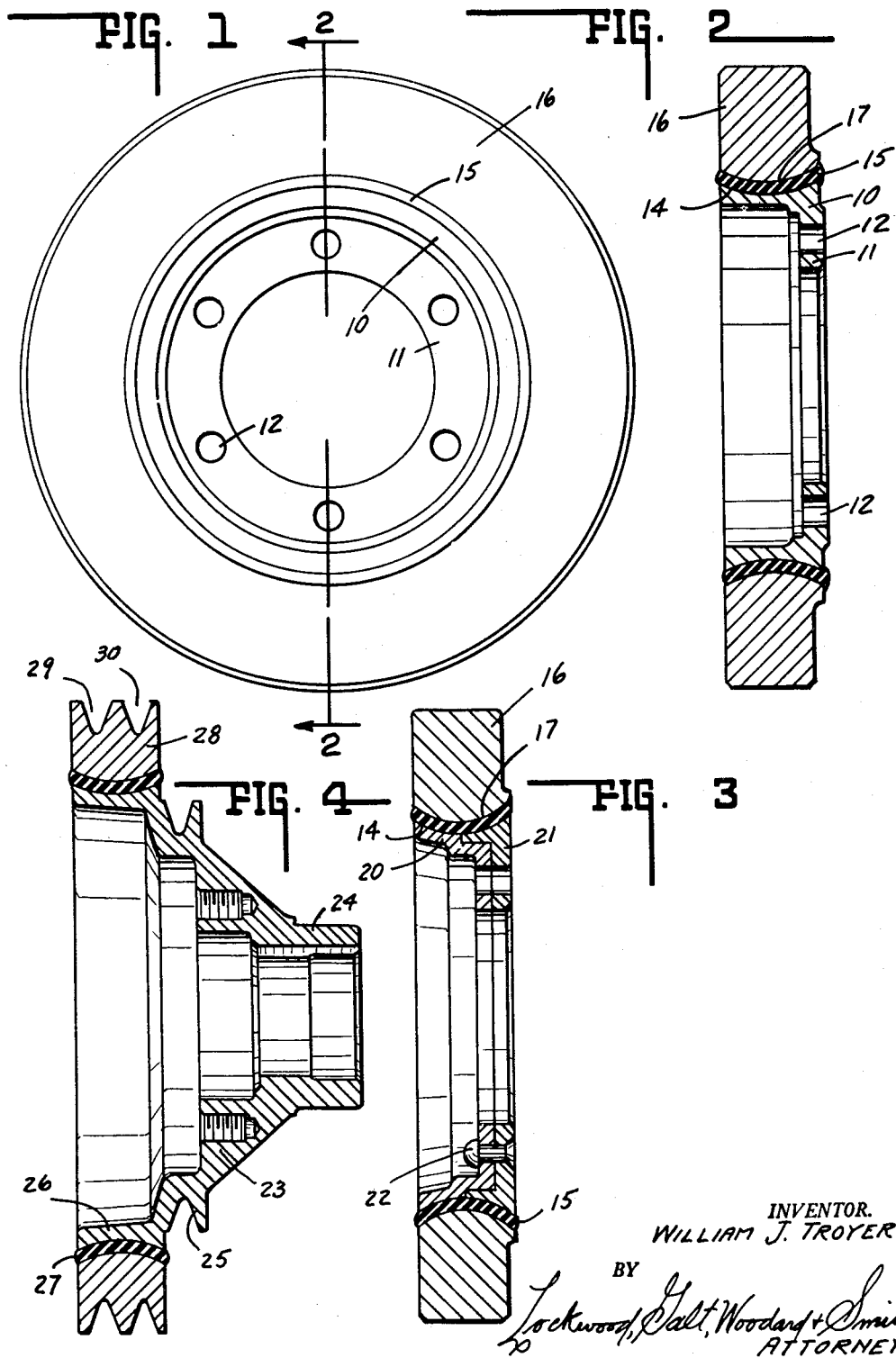

2,972,904

TORSIONAL VIBRATION DAMPER

William J. Troyer, Indianapolis, Ind., assignor to Schwitzer Corporation, Indianapolis, Ind., a corporation of Indiana Filed May 31, 1957, Ser. No. 662,842

9 Claims. (Cl. 74—574)

This invention relates generally to vibration dampers and more particularly it relates to torsional vibration dampers of the type adapted to be mounted on the end of the crankshaft of a reciprocating engine.

Conventional dampers of this character comprise two concentric members, the inner one of which may be attached to and driven from the engine crankshaft and the outer one of which may be a driven inertia member held in contact with the driving member by means of an elastic element. The elastic element may be precompressed on to the central driving member or may be bonded or otherwise adhered to both the central driving member and the driven inertia member. The elastic element or elastomer is used for tuning the assembly to the engine in such a manner that the elastomer absorbs portions of the vibrational energy created by the engine.

If there are large axial forces present which act in a plane displaced 90° relative to the rotational plane of the damper, dampers of the conventional type as described above may become defective in that the outer driven inertia member can slip actually from its position relative to the inner driving member. This may cause breaking or bending of its retaining devices or breaking or tearing of the metal-to-rubber bond. These axial forces can be created by fore and aft vibration of the engine, or fore and aft inertia forces of the engine caused by stopping and starting the propelled vehicle, or gyroscopic effects caused by the cyclic bending of the crankshaft, or combination of these forces and effects. Another possible cause of such axial forces may be spring motion of the vehicle which changes the gyroscopic plane of the engine and the damper. Some dampers are provided with pulley grooves in the driven inertia member and misalignment of associated drive belts can also cause such axial forces.

In order to prevent axial slipping of the driven inertia member relative to the driving member, elastomers having cross-sections in the form of a U, an inverted U, L, or J have been proposed. These shapes, however, complicate the molding process of the elastomer and the manufacture of the driving and driven members, and substantially raise unit costs.

Where bonding of the elastic element to the metal parts has been relied upon to prevent axial slipping, there is undesirable limitation of the physical properties of the elastic member. Also the assembly process becomes complex and unit costs are raised to a substantial degree.

The principal object of this invention is to provide an efficient torsional vibration damper having a structure such that torsional vibration stresses throughout the elastomer will be substantially equal.

Another object of this invention is to provide a torsional vibration damper having structure adapted to provide positive resistance to axial forces which may cause relative axial movement between the driving and driven members.

In accordance with this invention, there is provided a torsional vibration damper comprising an inner driving member having a concave outer peripheral surface, an outer driven inertia member in the form of an annulus having an inner surface, spaced from the concave surface of said driving member, and a convex curvature conforming with the curvature of the peripheral surface of said inner member, and an elastic member disposed between the concave surface of said inner member and the convex surface of said outer member.

The full nature of the invention will be understood from the accompanying drawing and the following description and claims:

Fig. 1 is a front elevation of the damper assembly embodying the present invention;

Fig. 2 is a cross-section taken on line 2—2 of Fig. 1;

Fig. 3 is a diametrical cross-section of a damper assembly embodying this invention in a modified form; and Fig. 4 is a diametrical cross-section of a damper assembly embodying this invention in another modified form.

The damper assembly embodying this invention comprises a driving member 10 having an inwardly extending flange 11 adapted to be mounted in suitable fashion on a hub, accessory drive pulley, or timing gear which is conventionally operatively associated with the crankshaft of a reciprocating engine. Flange 11 may include a plurality of apertures 12 for receiving bolts for attaching the driving member 10 to the hub or other apparatus normally associated with such a crankshaft. The driving member 10 may be in the form of a cylinder having an outer concave surface 14.

An elastic member 15 embraces the concave surface 14 and it, in turn, supports an outer driven inertia member 16 having a convex inner surface 17 bearing on elastic member 15. The elastic member 15 may consist of rubber or a similar elastic composition and may be injected into the space between surfaces 14 and 17 or otherwise placed in the position shown, either prior to or after curing. It is preferred that the elastic member 15 be in a state of radial compression between the driving member 10 and the inertia member 16. It is also preferred that the surface 17 of inertia member 16 have such curvature that torsional shearing stresses will be maintained substantially uniform throughout its axial length. Suitable bonding agents may or may not be applied to the surfaces 14 and 17 depending upon the mode of manufacture being used and practical operational conditions. It should be noted that the minimum inner diameter of surface 17 should exceed the maximum outer diameter of driving member 10 so that inertia member 16 may be assembled over driving member 10.

Because of the respective curvatures of surfaces 14 and 17, an axial force on the driving member 10, and an equal and opposite force on the inertia member 16 will cause portions of elastic member 15 to be placed in compression. The elastic material of member 15 has great resistance to compressive forces and compression of this material tends to increase the surface affinity between elastic member 15 and the surfaces 14 and 17. Accordingly relative axial movement between the driving member 10 and the inertia member 16 is resisted and members 10, 15 and 16 retain their relative positions to the point that there can be no surface slippage between these members and failure due to this cause is eliminated.

Referring to Fig. 3, the driving member consists of two parts 20 and 21 attached to one another by means of a plurality of rivets such as 22. The elastic member 15 and inertia member 16, corresponding to the same parts shown in Figs. 1 and 2, may be supported by assembled members 20 and 21. This modification of the invention permits formation of curved surfaces 14 and 17 with a shorter radius of curvature than is shown in Fig. 2. In other words, the minimum inner diameter of inertia member 16 may be smaller relative to the maximum outer diameter of assembled members 20 and 21. In assembling the modification of Fig. 3, members 20 and 21 may be inserted within inertia member 16 from opposite sides thereof, thereby permitting the greater degree of curvature of surfaces 14 and 17 without making the entire structure impossible of assembly.

The greater degree of curvature on surfaces 14 and 17 and the resulting greater area of mating surfaces, as shown in Fig. 3, provide positive assurance that inertia member 16 will not slip axially with respect to members 20 and 21, even though elastic member 15 may deteriorate to a substantial degree.

Fig. 4 illustrates still another modification of this invention wherein the driving member 23 comprises a crankshaft hub 24 and a pulley portion 25, together with cylindrical portion 26, which receives an elastic member 27. An inertia member 28 is supported over elastic member 27 in the same manner as described in connection with Figs. 2 and 3, and includes pulley grooves 29 and 30.

This modification of the invention provides reduction in overall cost of a combined damper structure and accessory drive pulley, reduction in total weight and reduction of parasitic inertia on the end of the crankshaft opposite the flywheel. Also the natural frequency of the engine is increased and the amplitude of vibration is reduced with a given combined weight of damper, hub, and accessory drive. All of these advantages are accomplished without adverse effect on the other parts of the engine or accessory drive belts.

Theoretical analysis and actual tests show conclusively that the most practical shape for the elastic element 15, with respect to torsional vibration only, is that of a circular band or a hollow cylinder. Torsional vibration produces more uniform stresses throughout this type of elastic element whereas other forms of elastic elements have points of excessive stress and heat concentration. The cylindrical type of elastic element is more capable of dissipating the heat which may be generated within the high hysteresis compounds which are normally used.

The cylindrical type of elastic element can be manufactured at a lower cost and by simpler manufacturing operations, but this type of elastic element would be at a disadvantage if installed in a reciprocating engine that will create such vibrational forces in an axial direction that it will tend to displace the inertia member relative to the driving member. This invention provides means consisting of the curved surfaces for locking the driving member and the inertia member together in such a way that there can be no relative axial displacement. Also the elastic member of this invention has substantially the same torsional shearing stresses throughout its axial length whereby there can be no localized concentration of stress and heat which might tend to cause deterioration of the elastic member. Axial forces cause the elastic member of this invention to be placed in compression whereas cylindrical elastic members are subjected to shearing action by axial forces. Accordingly this construction reduces the relative axial motion between the driving member and the inertia member and prevents slippage in an axial direction due to the fact that rubber and similar materials are much more resistant to compressive forces than to shearing forces. This makes bonding of the elastic element to the metallic surfaces unnecessary except in some cases where the unit is to operate in fluid mists or in liquid.

A further advantage of this invention is that the bending stresses on the engine crankshaft are reduced due to the increased rigidity of the damper assembly in an axial direction whereby the gyroscopic forces of the inertia member are effective in reducing bending stresses on the forward portions of the crankshaft.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A torsional vibration damper assembly for mounting in operative relation to the crankshaft of an engine comprising a driving member generally in the form of an annulus and attachable to one end of said crankshaft, said driving member including an axially extending rim in concentric relation to said crankshaft, said rim having a concave peripheral surface, a driven inertia member mounted concentrically of said driving member and including an annular convex surface radially spaced from the concave surface of said driving member, and a concavo-convex elastic element interposed between said convex surface and said concave surface in a state of radial compression, and said elastic element tuning the assembly to the engine in such a manner that said element absorbs portions of the vibrational energy created by the engine, the curvature of said concave and convex surfaces and of said elastic member being such that substantially uniform torsional shearing stresses occur throughout the elastic member such that a substantial compressive effect occurs between the driving member and the inertia member upon relative axial movement of said members, the internal diameter of said inertia member being greater than the maximum diameter of said driving member whereby said driving member may be assembled within said inertia member.

2. A torsional vibration damper assembly for mounting in operative relation to the crankshaft of an engine comprising a driving member generally in the form of an annulus and attachable to one end of said crankshaft, said driving member including an axially extending rim in concentric relation to said crankshaft, said rim having a concave peripheral surface, a driven inertia member mounted concentrically of said driving member and including an annular convex surface radially spaced from the concave surface of said driving member, and a concavo-convex elastic element interposed between said convex surface and said concave surface in a state of radial compression, and said elastic element tuning the assembly to the engine in such a manner that said element absorbs portions of the vibrational energy created by the engine, the curvature of said concave and convex surfaces and of said elastic member being such that substantially uniform torsional shearing stresses occur throughout the elastic member such that a substantial compressive effect occurs between the driving member and the inertia member upon relative axial movement of said members.

3. A torsional vibration damper assembly for mounting in operative relation to the crankshaft of an engine comprising a driving member generally in the form of an annulus and attachable to one end of said crankshaft, said driving member including an axially extending rim in concentric relation to said crankshaft, said rim having a concave peripheral surface, a driven inertia member mounted concentrically of said driving member and including an annular convex surface radially spaced from the concave surface of said driving member, and a concavo-convex elastic element interposed between said convex surface and said concave surface in a state of radial compression and said elastic element tuning the assembly to the engine in such a manner that said element absorbs portions of the vibrational energy created by the engine.

4. A torsional vibration damper assembly for mounting in operative relation to the crankshaft of an engine comprising a driving member generally in the form of an annulus and attachable to one end of said crankshaft in concentric relation to said crankshaft, said driving member having a concave peripheral surface, a driven inertia member mounted concentrically of said driving member and including an annular convex surface radially spaced from the concave surface of said driving member, and a concavo-convex elastic element interposed between said convex surface and said concave surface and said elastic element tuning the assembly to the engine in such a manner that said element absorbs portions of the vibrational energy created by the engine.

5. A torsional vibration damper assembly for mounting in operative relation to the crankshaft of an engine comprising a driving member attachable to one end of said crankshaft in centered relation to said crankshaft, an inertia member mounted coaxially of said driving member, said driving member and said inertia member including radially spaced concave and convex surfaces, and a concavo-convex elastic element interposed between said concave and convex surfaces in engagement with said surfaces and said elastic element tuning the assembly to the engine in such a manner that said element absorbs portions of the vibrational energy created by the engine.

6. A torsional vibration damper assembly for mounting in operative relation to a crankshaft of an engine comprising a driving member generally in the form of an annulus and attachable to one end of said crankshaft in concentric relation to said crankshaft, said driving member having a concave peripheral surface, a driven inertia member mounted concentrically of said driving member and including an annular convex surface radially spaced from the concave surface of said driving member, and a concavo-convex elastic element interposed between said convex surface and said concave surface in a state of radial compression, and said elastic element tuning the assembly to the engine in such a manner that said element absorbs portions of the vibrational energy created by the engine, the curvature of said concave and convex surfaces and of said elastic member being such that substantially uniform torsional shearing stresses occur throughout the elastic member such that a substantial compressive effect occurs between the driving member and the inertia member upon relative axial movement of said members.

7. The invention as set forth in claim 3, wherein said elastic element is interposed between said convex surface and said concave surface free of radial compression.

8. The invention as set forth in claim 4, wherein said driving member comprises a pair of annular ring members having concave peripheral surfaces disposed adjacent the convex surface of said inertia member.

9. The invention as set forth in claim 4, wherein said annulus includes a hub attachable to one end of said crankshaft and said hub and inertia members include pulley grooves formed on their external surfaces.

References Cited in the file of this patent

UNITED STATES PATENTS

| | | |
|---|---|---|
| 37,634 | Morely | Feb. 10, 1863 |
| 623,883 | Cameron | Apr. 25, 1899 |
| 1,358,189 | Fitzpatrick | Nov. 9, 1920 |
| 1,928,763 | Rosenberg | Oct. 3, 1933 |
| 2,526,744 | Hardy | Oct. 24, 1950 |
| 2,722,138 | Neher | Nov. 1, 1955 |
| 2,724,983 | O'Connor | Nov. 29, 1955 |
| 2,779,211 | Henrich | Jan. 29, 1957 |

FOREIGN PATENTS

| | | |
|---|---|---|
| 727,538 | Germany | Nov. 5, 1942 |
| 282,188 | Great Britain | Dec. 22, 1927 |
| 756,157 | Great Britain | Aug. 29, 1956 |